US007439906B1

(12) United States Patent
Blunt et al.

(10) Patent No.: US 7,439,906 B1
(45) Date of Patent: Oct. 21, 2008

(54) DOPPLER-COMPENSATED RADAR PULSE COMPRESSION PROCESSING SYSTEM AND METHOD

(75) Inventors: Shannon D Blunt, Shawnee, KS (US); Karl R Gerlach, Chesapeake Beach, MD (US); Kevin J Smith, Lawrence, KS (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 125 days.

(21) Appl. No.: 11/626,931

(22) Filed: Jan. 25, 2007

(51) Int. Cl.
*G01S 13/90* (2006.01)
(52) U.S. Cl. .................. 342/195; 342/25 F; 342/159; 342/162; 342/134; 342/135
(58) Field of Classification Search ............ 342/25 R, 342/25 A–25 F, 89–93, 98–102, 109–111, 342/115, 131, 132, 134, 135, 159, 162, 195
See application file for complete search history.

(56) References Cited

U.S. PATENT DOCUMENTS 5,539,412 A * 7/1996 Mendelson ............... 342/192
6,208,285 B1 * 3/2001 Burkhardt ................. 342/132
7,298,315 B2 * 11/2007 Gerlach et al. ............ 342/159
2005/0046612 A1 * 3/2005 Blunt et al. ............... 342/195
2006/0097908 A1 * 5/2006 Gerlach et al. ............ 342/159
2006/0097909 A1 * 5/2006 Blunt et al. ............... 342/159
2008/0074310 A1 * 3/2008 Blunt et al. ............... 342/189

FOREIGN PATENT DOCUMENTS

JP 03002687 A * 1/1991

* cited by examiner

*Primary Examiner*—John B Sotomayor
(74) *Attorney, Agent, or Firm*—John J. Karasek; L. George Legg

(57) ABSTRACT

A radar receiver system includes a receiver, a processor including a Doppler Compensated Adaptive Pulse Compressor (DCAPC) algorithm, possible other intermediate processing and a target detector. The DCAPC algorithm processes samples of a radar return signal, applies Minimum Mean Square Error (MMSE), or alternatively matched filtering, to the radar return signal to obtain initial radar impulse response estimates, computes power estimates, estimates a range cell Doppler shift for each range cell, computes range-dependent filters, applies the MMSE filters, and then repeats the cycle for subsequent reiterative stages until a desired length–L range window is reached, thereby resolving the scatterer from noise and other scatterers.

21 Claims, 4 Drawing Sheets

DOPPLER-COMPENSATED RADAR PULSE COMPRESSION PROCESSING SYSTEM AND METHOD

FIELD OF THE INVENTION

This invention relates to a radar processing method and system using adaptive pulse compression. More particularly, the invention relates to adaptive pulse compression radar processing that includes Doppler-mismatch compensation.

BACKGROUND OF THE INVENTION

Pulse compression allows a radar to obtain the range resolution of a short pulse without the need for very high peak transmit power. This is accomplished by transmitting a long pulse that is phase or frequency modulated. The modulated pulse, or waveform, is reflected back to the radar by scatterers that lie in the transmission path. This process can be viewed as the convolution of the transmitted waveform with an impulse response that is representative of the range profile illuminated by the radar. The purpose of pulse compression is then to estimate the range profile impulse response based upon the known transmitted waveform and the received radar return signal.

The traditional method of pulse compression is known as matched filtering which has been shown to maximize the received signal-to-noise ratio (SNR) for a solitary point scatterer. In the discreet domain, matched filtering can be expressed as $$\hat{x}_{NIF}(\Lambda) = s^H y(\Lambda) \tag{1}$$

where $\hat{x}_{NIF}(\Lambda)$, for $\Lambda=0, \ldots, L-1$, is the estimate of the $\Lambda^{th}$ delayed sample (range cell index). $s=[s_1 \ s_2 \ \ldots \ s_N]^T$ is the length-N sampled version of the transmitted waveform. $y(\Lambda)=[y(\Lambda) \ y(\Lambda+1) \ \ldots \ y(\Lambda+N-1)]^T$ is a vector of N contiguous samples of the received radar return signal, and $(\bullet)^H$ is the complex-conjugate transpose (or Hermitian) operation. Matched filtering, however, is plagued by range sidelobes that can cause the presence of large targets to mask nearby small targets thus limiting radar sensitivity.

Numerous approaches have been developed to reduce the range sidelobes resulting from matched filtering. These approaches include optimal mismatched filtering and Least-Squares estimation, as well as numerous other variations of each. Adaptivity in pulse compression was first introduced by W. F. Gabriel. "Superresolution techniques in the range domain." IEEE International Radar Conf., pp. 263-267. May 1990 and "Superresolution techniques and ISAR imaging," Naval Research Laboratory Memorandum Report, No. 6714. Sep. 21, 1990. in which numerous (>200) pulses were employed to estimate a sample covariance matrix with which to cancel the range sidelobes.

In another approach described in U.S. Pat. No. 6,940,450. Blunt et al., issued Sep. 6, 2005, and incorporated herein by reference, adaptive pulse compression (APC) by way of Reiterative Minimum Mean-Square Error (RMMSE) estimation has been shown to be an effective ay to mitigate range sidelobes on a single pulse basis. However, while still superior to the matched filter, APC can suffer degradation due to Doppler mismatch for targets with high radial velocity with respect to the radar.

There is, therefore, a need for an adaptive pulse compression system with improved robustness, accuracy, and resolution.

SUMMARY OF THE INVENTION

According to the invention, a method for processing a received radar pulse from a moving target includes a) receiving a return signal; b) obtaining $L+(2M-1)(N-1)$ samples y of the return signal, where $y(\Lambda)=\tilde{x}^T(\Lambda)s+v(\Lambda)$; c) applying Minimum Mean Square Error (MMSE) estimation to each successive N samples to obtain initial impulse response estimates $[\hat{x}_1\{-(M-1)(N-1)\}, \ldots, \hat{x}_1\{-1\}, \hat{x}_1\{0\}, \ldots, \hat{x}_1\{L-1\}, \hat{x}_1\{L\}, \ldots, \hat{x}_1\{L-1+(M-1)(N-1)\}]$; d) computing power estimates $\hat{\rho}_1(\Lambda)=|\hat{x}_1(\Lambda)|^2$ for $\Lambda=-(M-1)(N-1), \ldots, L-1+(M-1)(N-1)$; e) estimating a range cell Doppler shift for each range cell above user-selected magnitude; f) computing MMSE filters according to $w(\Lambda)=\rho(\Lambda)(\mathcal{C}(\Lambda)+R)^{-1}[s\circ e(\Lambda)]$, where $\rho(\Lambda)=|x(\Lambda)|^2$ is the power of $x(\Lambda)$. $R=E[v(\Lambda)v^H(\Lambda)]$ is the noise covariance matrix, and the range cell Doppler shifts are inserted; g) applying the MMSE filters to y to obtain $[\hat{x}_2\{-(M-2)(N-1)\}, \ldots, \hat{x}_2\{-1\}, \ldots, \hat{x}_2\{-1\}, \hat{x}_2\{L0\}, \ldots, \hat{x}_2\{L-1\}, \hat{x}_2\{L\}, \ldots, \hat{x}_2\{L-1+(M-2)(N-1)\}]$; and h) repeating (e)-(g) for subsequent reiterative stages until a desired length-L range window is reached, thereby resolving the scatterers from noise and other scatterers.

Alternatively matched filtering may be substituted for the initial MMSE in c), with the method otherwise being carried out as described for MMSE.

Also according to the invention, a radar receiver system includes a receiver, a processor including the Doppler Compensated Adaptive Pulse Compressor (DCAPC) algorithm, possible other intermediate pressing, and a target detector. The DCAPC algorithm processes samples of a radar return signal, initially applies Minimum Mean Square Error (MMSE), or alternatively matched filtering, to the radar return signal to obtain initial radar impulse response estimates, computes power estimates, estimates a range cell Doppler shift for each range cell, computers range-dependent filters, applies the MMSE filters, and then repeats the cycle for subsequent reiterative stages until a desired length-L range window is reached, thereby resolving the scatterer from noise and other scatterers.

The invention has obvious applications in military radar, and it is also useful for civilian radar, e.g. in airport radar system and in weather radar systems, e.g. Doppler radar, and other environmental radar applications. It may also find use in range profiling, image recognition for Synthetic Aperture Radar (SAR), and Inverse SAR (ISAR).

Additional features and advantages of the present invention will be set forth in, or be apparent from, the detailed description of preferred embodiments which follows.

DETAILED DESCRIPTION OF THE PREFERRED EMBODIMENTS

Figure 1:
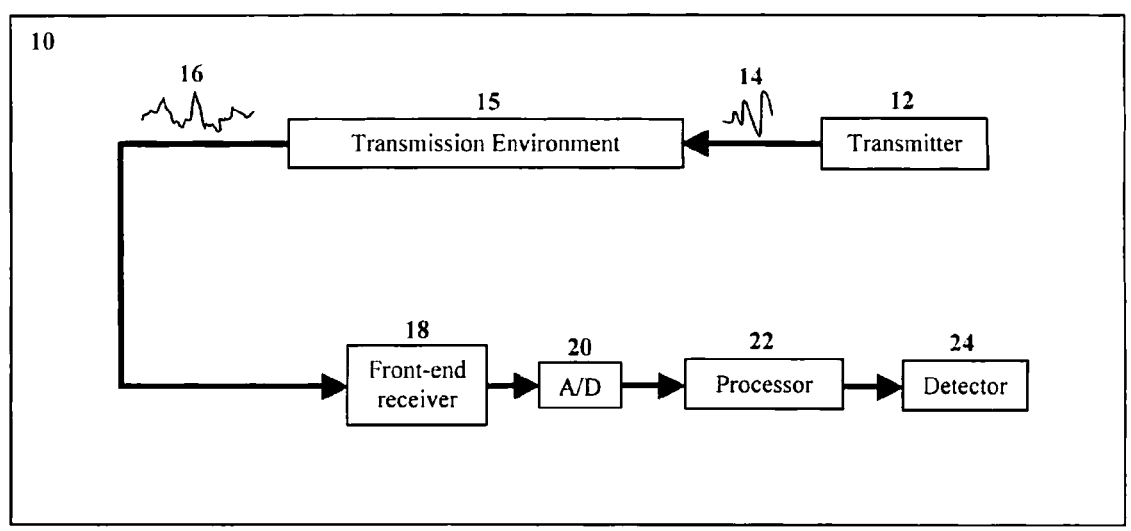
FIG. 1 is a schematic diagram of a radar processing system according to the invention.

Referring now to FIG. 1, an adaptive pulse compression with Doppler compensation radar processing system 10 includes a transmitter 12 for transmitting a modulated pulse (or waveform) 14, that upon interacting with its transmission environment's unknown impulse response 15 (to be estimated, as is described further below) forms a signal 16 that is a convolution of waveform 14 and impulse response 15, an analog front-end receiver 18 for receiving signal 16, an optional analog-to-digital (A/D) converter 20, a processor 22 having a computer readable storage medium, such as a hard drive, RAM, or the like, for processing analog or digital signal 16, and a detector 24. The processor 22 includes an adaptive pulse compression with Doppler compensation algorithm, as is described below.

The new Doppler Compensated Adaptive Pulse Compressor (DCAPC) is based upon a minimum mean-square error (MMSE) formulation. We denote the discrete-time version of the transmitted waveform as the vector s having N samples. The $\Lambda^{th}$ sample of the received radar return is defined as $$\tilde{y}(\Lambda) = \tilde{x}^T(\Lambda)s + v(\Lambda) \tag{2}$$

where $\tilde{x}(\Lambda)$ is modeled as $$\tilde{x}(\Lambda) = x(\Lambda) \circ e(\Lambda) \tag{3}$$

for $\Lambda = 0, \ldots, L+N-2$, where $x(\Lambda) = [x(\Lambda) \ x(\Lambda-1) \ldots x(\Lambda-N+1)]^T$ is the vector of N contiguous samples of the range profile impulse response, $v(\Lambda)$ is additive noise, $(\cdot)^T$ is the transpose operation, and $\circ$ represents the Hadamard product (element-by-element multiplication). The vector $e(\Lambda) = [1 e^{j\theta_{l-1}} \ldots e^{j(N-1)\theta_{l-N-1}}]$ is comprised of the Doppler phase shifts for the same N contiguous samples as $x(\Lambda)$ in which $\theta_\Lambda$ is the Doppler phase shift induced by a moving target at the $\Lambda^{th}$ range cell between successive received samples. The collection of N samples of the received return signal $\tilde{y}(\Lambda) = [\tilde{y}(\Lambda) \ \tilde{y}(\Lambda+1) \ldots \tilde{y}(\Lambda+N-1)]^T$ can be expressed as $$\tilde{y}(\Lambda) = \tilde{A}^T(\Lambda)s + v(\Lambda) \tag{4}$$

where $v(\Lambda) = [v(\Lambda) \ v(\Lambda+1) \ldots v(\Lambda+N-1)]^T$ and $$\tilde{A}(l) = \begin{bmatrix} x(l) & x(l+1) & \ldots & x(l+N-1) \\ x(l-1)e^{j\theta_{l-1}} & x(l)e^{j\theta_l} & & x(l+N-2)e^{j\theta_{l+N-2}} \\ \vdots & \vdots & \ddots & \vdots \\ x(l+N-1)e^{j(N-1)\theta_{l+N-1}} & x(l+N-2)e^{j(N-1)\theta_{l+N-2}} & \ldots & x(l)e^{j(N-1)\theta_l} \end{bmatrix} \tag{5}$$

Using the received signal model of (4) we minimize the MMSE cost function $$J(l) = E\left[|x(l) - w^H(l)\tilde{y}(l)|^2\right] \tag{6}$$

for $w(\Lambda)$, $\Lambda = 0, 1, \ldots, L-1$, where $w(\Lambda)$ is the MMSE pulse compression filter used to estimate $x(\Lambda)$ and $E[\cdot]$ is the expectation operator. Minimization of (6) yields $$w(\Lambda) = (E[\tilde{y}(\Lambda)\tilde{y}^H(\Lambda)])^{-1} E[\tilde{y}(\Lambda)x^*(\Lambda)] \tag{7}$$

where $(\cdot)^*$ is the complex conjugate operation. Substituting for $\tilde{y}(\Lambda)$ from (4), and assuming that the radar range returns are, in general, uncorrelated with one another and also uncorrelated with the noise, we obtain $$w(\Lambda) = \rho(\Lambda) \ (\mathfrak{C}(\Lambda) + R)^{-1} [s \circ e(\Lambda)] \tag{8}$$

where $\rho(\Lambda) = E[|x(\Lambda)|^2]$ is the expected power of $x(\Lambda)$, $R = E[v(\Lambda) v^H(\Lambda)]$ is the noise covariance matrix, and the matrix $\mathfrak{C}(\Lambda) = E[\tilde{A}^T(\Lambda)s \ s^H \tilde{A}^*(\Lambda)]$ can be simplified as $$\tilde{C}(l) = \sum_{n=-N+1}^{N-1} \rho(l+n)\tilde{s}_n(l+n)\tilde{s}_n^H(l+n) \tag{9}$$

in which $\tilde{s}_n(\Lambda+n) = [0 \ldots 0 \ s_0 \ s_1 e^{j\theta_{\Lambda+n}} \ldots s_{N-n-1} e^{j(N-n-1)\theta_{\Lambda+n}}]^T$ with n preceding zeros for $n \geq 0$ and $\tilde{s}_n(\Lambda+n) = [s_{-n} e^{j(-n)\theta_{\Lambda+n}} \ldots s_{N-1} e^{j(N-1)\theta_{\Lambda+n}} \ 0 \ldots 0]^T$ with n zeros at the end for $n \leq 0$.

The Doppler Compensated Adaptive Pulse Compressor (DCAPC) is implemented by inserting the current estimates of the respective range cell powers $\hat{\rho}(\Lambda) = |\hat{x}(\Lambda)|^2$ and range cell Doppler shifts $\hat{\theta}_\Lambda$ into (8) and (9) and then applying the resulting receive filter $w(\Lambda)$ to the received signal $\tilde{y}(\Lambda)$ to estimate the complex range cell amplitude $x(\Lambda)$ for each $\Lambda = 0, 1, \ldots, L-1$. This, then, provides a new estimate of the range cell complex amplitudes which can be used to repeat the process. The estimation of the individual Doppler shifts will be addressed shortly. The initialization of the range cell powers can be obtained from the output of the matched filter or by applying a simplified version of (8) and (9) as follows.

In its current stage, the MMSE pulse compression filter is a function of the powers of the surrounding range cells and their respective Doppler phage shifts, all of which are unavailable in practice. This lack of prior knowledge can be accounted for by setting all the initial range cell estimates to be equal to all the initial Doppler shift estimates to zero. In so doing, and treating the noise as negligible initially, the initial MMSE filter takes on the form $$w_1 = C_1^{-1} s \tag{10}$$

where $$C_1 = \sum_{n=-N+1}^{N-1} s_n s_n^H \tag{11}$$

in which $s_n = [0 \ldots 0 \ s_0 \ s_1 \ldots s_{N-n-1}]^T$ with n preceding zeros for $n \geq 0$ and $s_n = [s_{-n} \ldots s_{N-1} \ 0 \ldots 0]^T$ with n zeros at the end for $n \leq 0$. The initial MMSE pulse compression filter is invariant to the range cell delay $\Lambda$ and can be pre-computed and then implemented in the same way as the traditional matched filter. Alternatively, the initial filtering can be accomplished by the matched filter.

Applying either the standard matched filter as in (1) or the MMSE filter $w_1$ from (10) and (11) in place of s in (1) yields an initial estimate of the radar range profile. As such, either the MMSE filter or the matched filter can be used initially. The initial range cell estimates resulting from initial filtering (via either MMSE or matched filtering) then provide approximate information that can be employed within the MMSE formulation of (8) and (9) in order to re-estimate the appropriate receive filter to use for each individual range cell which is dependent upon the values of the surrounding range cells. In addition, the availability of the initial range cell estimates also enables the estimation of the Doppler phase shifts of range cells with large target returns which can then be incorporated into the MMSE formulation in (8) and (9) as well in order to further improve the accuracy of the receive filters.

Knowledge of target Doppler shifts can be used to more closely match the individual receive filters as well as to better null the range sidelobe interference from nearby large targets. Along with the range cell complex amplitudes, the range cell Doppler shifts can be estimated from the received data. Initially, the Doppler estimates are set to zero (or some assumed Doppler offset for a moving platform) because it can reasonably be assumed that the vast majority of range cell will not contain a moving target. Upon setting the initial Doppler phase shift estimates to zero, the received return signal for a single high SNR point target can be approximately expressed as the vector $$y(\Lambda) = x(\Lambda) \cdot [s_0 \, s_1 e^{j\theta_1} \ldots s_{N-1} e^{j(N-1)\theta_\Lambda}]. \quad (12)$$

Hence, the application of the matched filter s as in (1) yields $$\hat{x}_{MF}(\Lambda) = x(\Lambda) \cdot (|s_0|^2 + |s_1|^2 e^{j\theta_\Lambda} + \ldots + |s_{N-1}|^2 e^{j(N-1)\theta_\Lambda}). \quad (13)$$

Based on (13) and assuming a constant modulus waveform (which is standard practice), it can be seen that the ratio of consecutive terms in the summation can be used as an estimate of the Doppler phase shift. Furthermore, the ratio of consecutive partial sums in (13) also yields an estimate of the Doppler phase shift while also exploiting some of the pulse compression integration gain to increase SNR. For example, one could estimate the Doppler by computing the phase angle of $$\frac{x(l) \cdot (|s_1|^2 e^{j\theta_l} + \ldots + |s_{N-1}|^2 e^{j(N-1)\theta_l})}{x(l) \cdot (|s_0|^2 + \ldots + |s_{N-2}|^2 e^{j(N-2)\theta_l})}. \quad (14)$$

The denominator in (14) is the first N−1 elements in the summation of (13) and the numerator in (14) is the last N−1 elements from (13). The partial summations in (14) can be obtained by applying selected portions of the matched filter; i.e. the first N−1 elements of the matched filter and the last N−1 elements, respectively.

In a general sense, the partial matched filters can be applied as $$g(\Lambda) = B_{MF}^H y(\Lambda). \quad (15)$$

in which $$B_{MF} = \begin{bmatrix} \bar{s}_0 & & & 0 \\ & \bar{s}_1 & & \\ & & \ddots & \\ 0 & & & \bar{s}_M \end{bmatrix}_{N-(M+1)} \quad (16)$$

with $\bar{s}_m = [s_m \ldots s_{N-M-m-1}]$hu T where m=0,1, ..., M for M∈[1, 2, ..., N−1]. Hence, each partial matched filter in $B_{MF}$ has length N−M and g(Λ) will be comprised of M+1 elements from which M ratios as in (14) can be obtained. The Doppler phase shift $\theta_\Lambda$ can then be estimated either as $$\hat{\theta}_i = \angle \left[ \sum_{m=1}^{M} \frac{g_m(l)}{g_{m-1}(l)} \right], \text{ or as} \quad (17)$$

$$\hat{\theta}_l = \frac{1}{M} \sum_{m=1}^{M} \angle \left[ \frac{g_m(l)}{g_{m-1}(l)} \right], \quad (18)$$

where $g_m(\Lambda)$ is the $m^{th}$ element of g(Λ) and ∠[•] is the angle of the complex value of the argument. The estimate in (17) will be heavily influenced by any dominant values of the quotient resulting from overly small or large terms in g(Λ) (albeit it can be reasonably expected that all the terms will be of comparable magnitude). Conversely, the estimate in (18) is unaffected by magnitude variations but may be more sensitive to phase errors. Also, the formulation in (15) and (16) provides a choice (through the value of M) in the trade-off between almost full pulse compression integration gain (M=1) and the maximum number of samples over which to average the Doppler phase shift estimate (M=N−1). It has been found via simulation experimentation that values in the neighborhood of the middle (M≈N/2) tend to work best.

The estimation of the Doppler phase shift using the matched filter, while computationally efficient, only works well in cases where solitary point targets are present (i.e. targets sparsely populated in range). The matched filter based Doppler estimate degrades when one or more targets with comparable SNR are in relatively close proximity as the interference from neighboring targets acts to skew the Doppler estimates. To mitigate the effects of interference from other nearby targets on the estimation of $\theta_\Lambda$, the MMSE formulation can again be employed in which $B_{MF}$ in (15) is replaced by $$B_{MMSE}(l) = \begin{bmatrix} \bar{w}_0(l) & & & 0 \\ & \bar{w}_1(l) & & \\ & & \ddots & \\ 0 & & & \bar{w}_M(l) \end{bmatrix}_{N-(M+1)} \quad (19)$$

The $m^{th}$ MMSE sub-filter $\bar{w}_m(\Lambda)$ of length N−M is computed by partitioning Doppler-omitted versions of (8) and (9) as $$\bar{w}_m(\Lambda) = \rho(\Lambda)(\bar{C}_m(\Lambda) + \bar{R})^{-1} \bar{s}_m \quad (20)$$

where $\bar{R}$ is an (N−M)×(N−M) principal submatrix of R, the (N−M)×(N−M) matrix $\bar{C}_m(\Lambda)$ is the $(m+1)^{st}$ principal submatrix of $$C(l) = \sum_{n=-N-1}^{N-1} \rho(l+n) s_n s_n^H \text{ for } m = 0, 1, \ldots, M.$$

Note that Doppler phase shift information is not employed in the MMSE sub-filter formulation of (20). By nulling the interference from nearby targets, the MMSE formulation in (19) and (20) effectively approximates the Doppler estimate for a solitary point target as in (14) thereby significantly reducing the likelihood of mis-estimating θhd Λ. To further reduce the likelihood of mis-estimating $\theta_\Lambda$, only the Doppler shifts of relatively large target returns are estimated. This greatly lessens the likelihood that nearby large targets may skew the estimate of $\theta_\Lambda$ for small targets, which in any case do not cause significant Doppler-induced range sidelobes. A variable threshold can be set by the operator or user according to the noise power and/or current local power estimates in order to determine which range cells are candidates for Doppler estimation. As the range sidelobes are driven down at each successive stage the threshold may be reduced somewhat in order to compensate for the Doppler mismatch of slightly lower target returns. In addition, as a robustness measure an upper limit may be placed on the value of the Doppler estimate such that it is maintained within practical bounds for the specific radar application and scenario.

The Doppler phase shift estimate obtained form either (17) or (18) can be incorporated into the MMSE filter formulation of (8) and (9) along with the current range cell power estimates in order to re-estimate the appropriate the receive filter for each individual range cell. It has been found based on simulation experimentation that this process of alternating the estimation of the range cell complex amplitudes and Dopplers with the estimation of the receive filters need only be repeated 2-4 times inclusive of the initialization stage.

The preferred embodiment of the invention includes the use of the MMSE sub-filter of (19) and (20) followed by Doppler estimation using either (17) or (18) along with the Adaptive Pulse Compression portion from (8) and (9). Also, the robustness parameter $\alpha$ as described in (U.S. patent app. NC 96.123) in which $\hat{\rho}(\Lambda)=|\hat{x}(\Lambda)|^2$ is replaced with $\hat{\rho}(\Lambda)=|\hat{x}(\Lambda)|^\alpha$, for $1.1 \leq \alpha \leq 1.8$, would preferably be used in (8) and (9) so that the matrix $\mathcal{C}(\Lambda)$ does not become ill-conditioned as well as in (20) for the MMSE sub-filters so that $\overline{C}_m(\Lambda)$ is not ill-conditioned.

Figure 2:
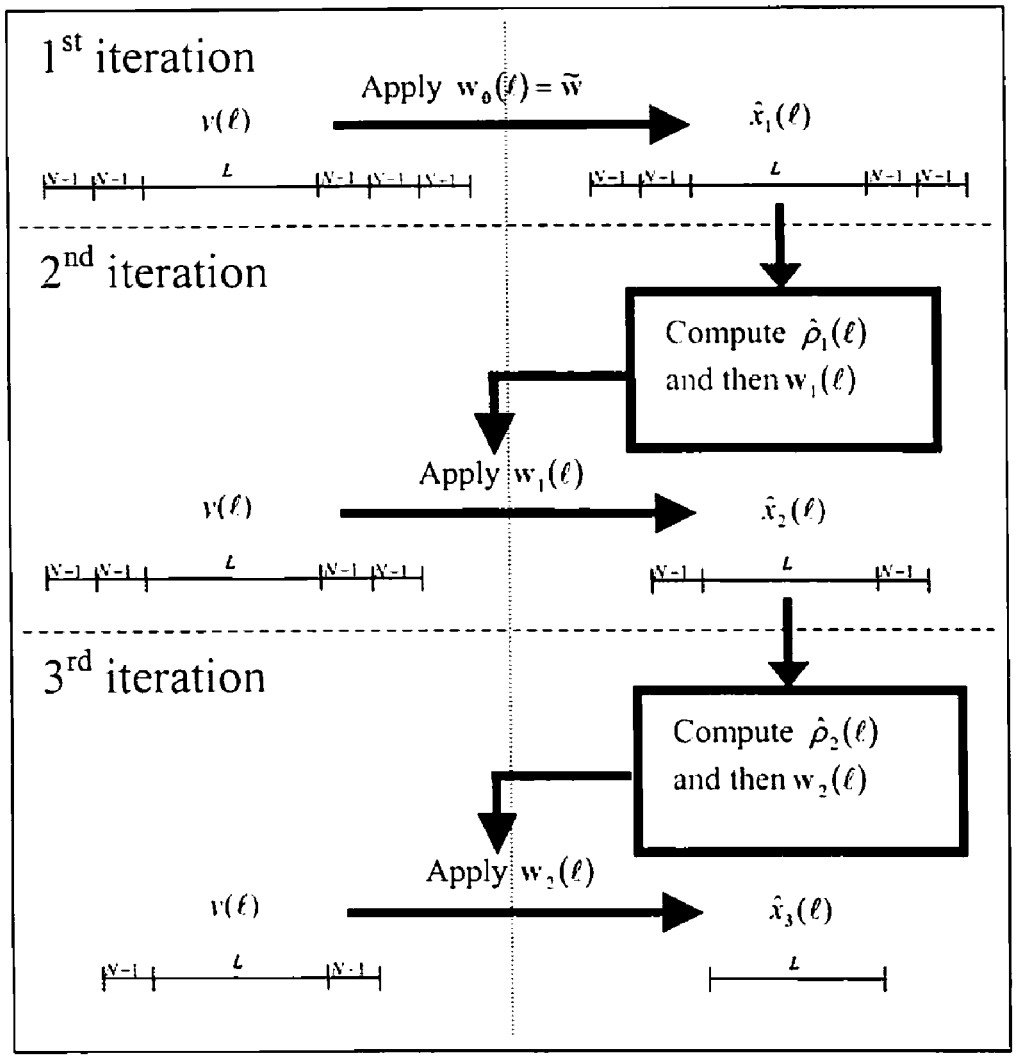
FIG. 2 is a block diagram of a 3-stage RMMSE adaptive pulse compression algorithm according to the invention.

FIG. 2 illustrates the Reiterative MMSE (RMMSE) adaptive pulse compression algorithm for three iterations. In general, the RMMSE algorithm operates as follows:

1) Collect the L+(2M−1)(N−1) samples of the received return signal [y|−(M−1)(N−1)|, ..., y{−1}, y{0}, ..., y{L−1}, y{L}, ..., y{L−1+M(N−1)}], which comprise the length-L data window along with the (M−1)(N−1) samples prior to the data window and the M(N−1) samples after the data window.
2) Apply either the initial MMSE filter from (13) or the matched filter as in (1) to obtain the initial impulse response estimates [$\hat{x}_1\{-(M-1)(N-1)\}$, ..., $\hat{x}_1\{-1\}$, $\hat{x}_1\{0\}$, ..., $\hat{x}_1\{L-1\}$, $\hat{x}_1\{L\}$, ... $\hat{x}_1\{L-1+(M-1)(N-1)\}$].
3) Compute the initial power estimates $\hat{\rho}_1(\Lambda)=|\hat{x}_1(\Lambda)|^2$ for $\Lambda=-(M-1)(N-1), \ldots, L-1+(M-1)(N-1)$ which are used to compute the filters $w_1(\Lambda)$ as in (11), and then apply to $\tilde{y}(\Lambda)$ to obtain [$\hat{x}_2\{-(M-2)(N-1)\}$, ..., $\hat{x}_2\{-1\}$, $\hat{x}_2\{0\}$, ..., $\hat{x}_2\{L-1\}$, $\hat{x}_2\{L\}$, ..., $\hat{x}_2\{L-1+(M-2)(N-1)\}$].

4) Repeat 2) and 3), changing the indices where appropriate, until the desired length-L data window is reached.

Figure 3:
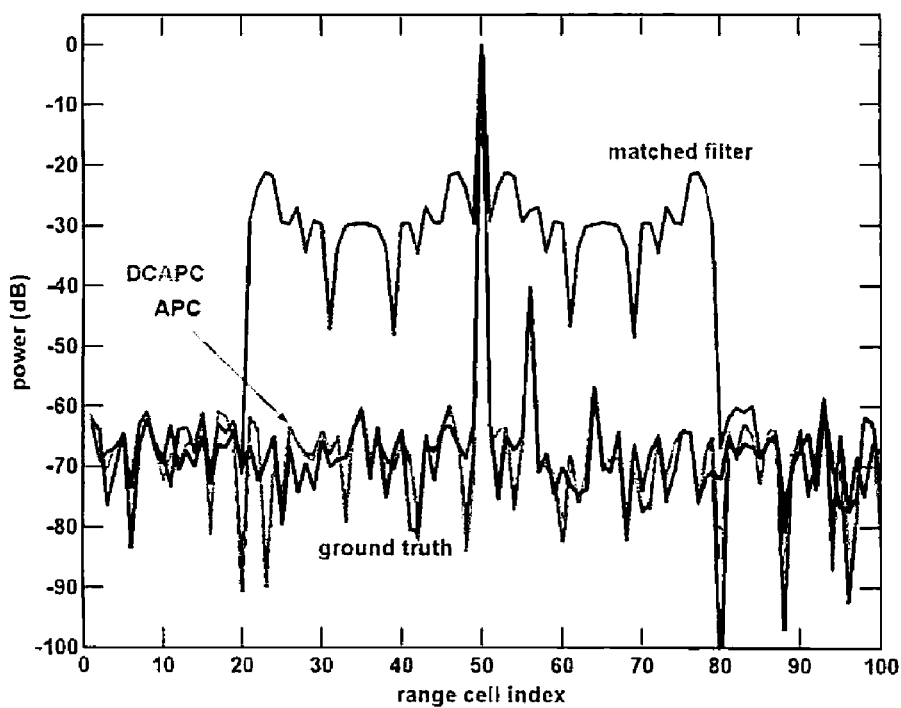
FIG. 3 is a graph showing a range profile estimate comparison of other processes to the invention for a stationary target.

Use of the Doppler Compensated Adaptive Pulse Compressor (DCAPC) can significantly reduce degradation resulting from severe Doppler mismatch as compared to matched filtering and the original APC algorithm, which has otherwise been shown to provide very good performance. In so doing, DCAPC enables the estimation of a high-speed target profile with considerably higher accuracy thereby facilitating greatly enhanced identification capability. As a simple example FIG. 3 depicts the range profile estimate of the matched filter the original APC algorithm (3 stages including initialization), and DCAPC algorithm (3 stages with M=20) for a range profile consisting of a large stationary (no Doppler) target and a small nearby target in which a length N=30 discrete Lewis-Kretschmer P3 code was employed as the transmitted waveform. As has been shown previously, the APC algorithm greatly outperforms the matched filter. Also, the new DCAPC algorithm performs just as well as APC: both uncover the small target that is masked when matched filtering is employed. In terms of Mean-Square Error (MSE), APC and DCAPC achieve MSE values of −72 dB and −68 dB, respectively, which are considerably better that the −29 dB attained by matched filtering.

Figure 4:
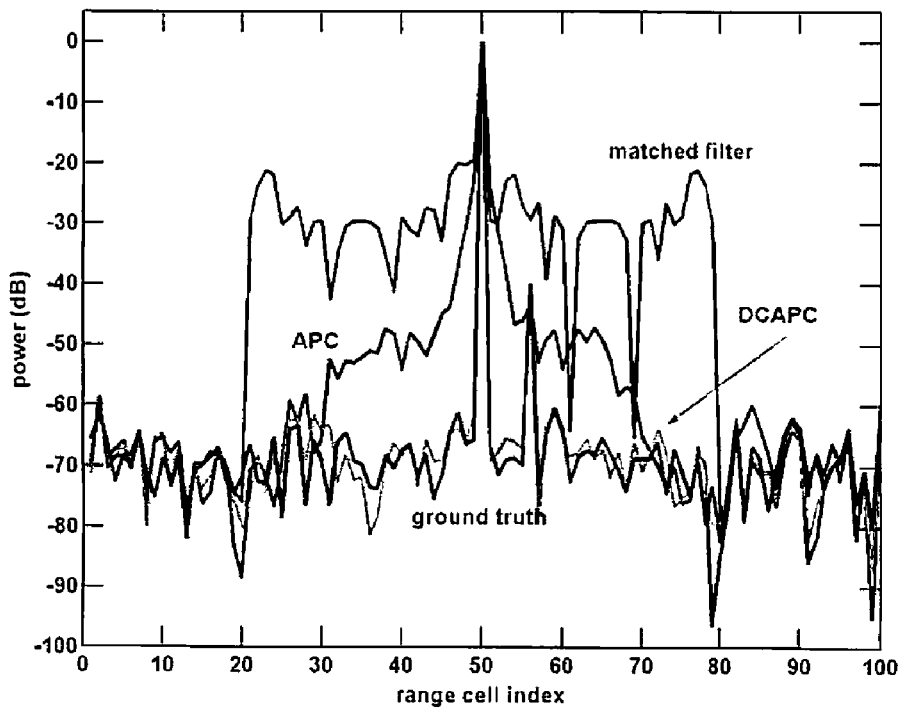
FIG. 4 is a graph as in FIG. 3 except that the target is moving.

By comparison with the stationary case, FIG. 4 depicts the results for matched filtering, APC (3 stages), and DCAPC (3 stages with M=20) for the same scenario except that the large target is moving at a speed that corresponds to a 25° Doppler phase shift over the length of the waveform. This Doppler shift is analogous to a Mach 3 target illuminated by a 1 μs pulse of an X-band radar. As FIG. 4 illustrates, while still superior to the matched filter the sensitivity of APC is significantly degraded due to the effects of Doppler-induced range sidelobes and the small target is now masked by the Doppler-mismatch induces range sidelobes. However, by estimating and subsequently compensating for the Doppler mismatch of the large target, DCAPC is able to estimate the range profile to the level of the noise floor thereby unmasking the small nearby target. In terms of MSE, the matched filter reaches −27 dB while APC degrades significantly to −32 dB. The DCAPC algorithm, on the other hand, achieves −57 dB, a 30 dB improvement over matched filtering and 25 dB better than APC.

Figure 5:
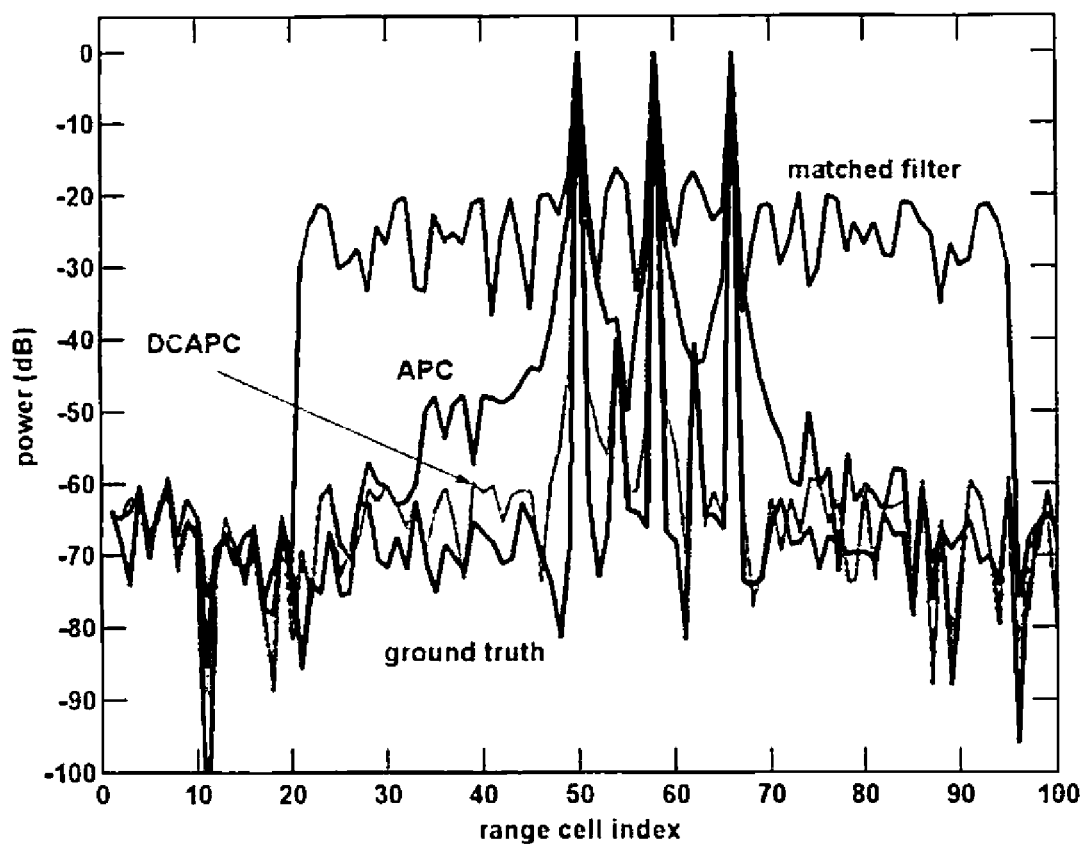
FIG. 5 is a graph as in FIG. 4 except there are three fast-moving targets in close proximity.

For an even more stressing scenario consider FIG. 5 in which there are three large fast-moving targets in close proximity. The three large targets have Doppler phase shifts of +1.5°, −10°, and +5° over the extent of the waveform, respectively. Hence, the three targets are moving at significantly different velocities with the 1st and 3rd approaching the radar and the 2nd receding. Furthermore, there are 2 smaller stationary targets between the 3 large targets. As the results of FIG. 5 show, the matched filter again performs poorly. APC outperforms the matched filter yet is still degraded due to the Doppler-induced range sidelobes. DCAPC (with M=20) dramatically reduces the range sidelobes thereby unmasking the 2 smaller stationary targets. In terms of MSE, the matched filter reaches −23 dB. APC attains −30 dB, and DCAPC achieves −59 dB.

Obviously many modifications and variations of the present invention are possible in the light of the above teachings. It is therefore to be understood that the scope of the invention should be determined by referring to the following appended claims.

We claim:
1. A method for processing a received radar pulse from a moving target, comprising:
   a) receiving a return signal;
   b) obtaining L+(2M−1 (N−1) samples y of the return signal, where $y(\Lambda)=\tilde{x}^T(\Lambda)s+v(\Lambda)$:
   c) applying Minimum Mean Square Error (MMSE) estimation to each successive N samples to obtain initial impulse response estimates [$\hat{x}_1\{-(M-1)(N-1)\}$, ..., $\hat{x}_1\{-1\}$, $\hat{x}_1\{0\}$, ..., $\hat{x}_1\{L-1\}$, $\hat{x}_1\{L\}$, ..., $\hat{x}_1\{L-1+(M-1)(N-1)\}$];
   d) computing power estimates $\hat{\rho}_1(\Lambda)=|\hat{x}_1(\Lambda)|^2$ for $\Lambda=-(M-1)(N-1), \ldots, L-1+(M-1)(N-1)$;

e) estimating a range cell Doppler shift for each range cell magnitude estimate above a user-selected threshold;

f) computing MMSE filters according to $w(\Lambda)=\rho(\Lambda)(\mathcal{C}(\Lambda)+R)^{-1}[s \circ e(\Lambda)]$, where $\rho(\Lambda)=|x(\Lambda)|^2$ is the power of $x(\Lambda)$, $R=E[v(\Lambda)\,v^H(\Lambda)]$ is the noise covariance matrix, and the range cell Doppler shifts are inserted;

g) applying the MMSE filters to y to obtain $[\hat{x}_2\{-(M-2)(N-1)\}, \ldots, \hat{x}_2\{-1\}, \hat{x}_2 0\}, \ldots, \hat{x}_2(L-1)$, $\hat{x}_2\{L\}, \ldots, \hat{x}_2\{L-1+(M-2)(N-1)\}]$; and h) repeating (e)-(g) for subsequent reiterative stages until a desired length-L range window is reached, thereby resolving the scatterers from noise and other scatterers.

2. A method as in claim 1, wherein the MMSE estimation is performed with a plurality of parallel processors.

3. A method as in claim 1, further comprising setting a nominal level for which the power estimates $\rho(\Lambda)=|x(\Lambda)|^2$ are not allowed to fall below.

4. A method as in claim 1, wherein the y samples are obtained via analog/digital (A/D) conversion.

5. A method as in claim 1, wherein the method is applied in range profiling.

6. A method as in claim 1, wherein the method is applied for synthetic Aperture Radar (SAR).

7. A method as in claim 1, wherein the method is applied for Inverse SAR (ISAR).

8. A method as in claim 1, wherein the Doppler shift is determined from the equation $$g(\Lambda)=B_{MF}{}^H y(\Lambda),$$

in which $$B_{MF} = \begin{bmatrix} \bar{s}_0 & & & 0 \\ & \bar{s}_1 & & \\ & & \ddots & \\ 0 & & & \bar{s}_M \end{bmatrix}_{N-(M+1)}$$

with $\bar{s}_m=[s_m \ldots s_{N-M-m-1}]^T$ where $m=0,1,\ldots,M$ for $M\epsilon[1, 2,\ldots, N-1]$, and the Doppler phase shift $\theta_\Lambda$ is then estimated as $$\hat{\theta}_i = \angle\left[\sum_{m=1}^{M} \frac{g_m(l)}{g_{m-1}(l)}\right],$$

where $g_m(\Lambda)$ is the $m^{th}$ element of $g(\Lambda)$ and $\angle[\bullet]$ is the angle of the complex value of the argument.

9. A method is in claim 1, wherein the Doppler shift is determined from the equation $$g(\Lambda)=B_{MMSE}{}^H y(\Lambda)$$

in which $$B_{MMSE}(l) = \begin{bmatrix} \bar{w}_0(l) & & & 0 \\ & \bar{w}_1(l) & & \\ & & \ddots & \\ 0 & & & \bar{w}_M(l) \end{bmatrix}_{N-(M+1)},$$

the $m^{th}$ MMSE sub-filter $\bar{w}_m(\Lambda)$ of length N–M is computed according to $$\bar{w}_m(\Lambda)=\rho(\Lambda)(\tilde{C}_m(\Lambda)+\bar{R})^{-1}\bar{s}_m$$

where $\bar{R}$ is an (N–M)×(N–M) principal submatrix of R, and the (N–M)×(N–M) matrix $\bar{C}_m(\Lambda)$ is the $(m+1)^m$ principal submatrix of $$C(l) = \sum_{n=-N-1}^{N-1} \rho(l+n) s_n s_n^H \text{ for } m = 0, 1, \ldots, M.$$

and the Doppler base shift $\theta_\Lambda$ is then estimated as $$\hat{\theta}_i = \angle\left[\sum_{m=1}^{M} \frac{g_m(l)}{g_{m-1}(l)}\right],$$

where $g_m(\Lambda)$ is the $m^{th}$ element of $g(\Lambda)$ and $\angle[\bullet]$ is the angle of the complex value of the argument.

10. A method as in claim 1, wherein the Doppler shift is determined from the equation $$g(\Lambda)=B_{MF}{}^H y(\Lambda),$$

in which $$B_{MF} = \begin{bmatrix} \bar{s}_0 & & & 0 \\ & \bar{s}_1 & & \\ & & \ddots & \\ 0 & & & \bar{s}_M \end{bmatrix}_{N-(M+1)}$$

with $\bar{s}_m=[s_m \ldots s_{N-M-m-1}]^T$ where $m=0,1,\ldots,M$ for $M\epsilon[1, 2,\ldots, N-1]$, and the Doppler phase shift $\theta_\Lambda$ is then estimated as $$\hat{\theta}_l = \frac{1}{M}\sum_{m=1}^{M} \angle\left[\frac{g_m(l)}{g_{m-1}(l)}\right],$$

where $g_m(\Lambda)$ is the $m^{th}$ element of $g(\Lambda)$ and $\angle[\bullet]$ is the angle of the complex value of the argument.

11. A method as in claim 1, wherein the Doppler shift is determined from the equation $$g(\Lambda) = B_{MMSE}{}^H y(\Lambda),$$

in which $$B_{MMSE}(l) = \begin{bmatrix} \bar{w}_0(l) & & & 0 \\ & \bar{w}_1(l) & & \\ & & \ddots & \\ 0 & & & \bar{w}_M(l) \end{bmatrix}_{N-(M+1)},$$

the $m^{th}$ MMSE sub-filter $\bar{w}_m(\Lambda)$ of length N–M is computed according to $$\bar{w}_m(\Lambda)=\rho(\Lambda)\,(\mathcal{C}_m(\Lambda)+\bar{R})^{-1}\bar{s}_m$$

where $\overline{R}$ is an $(N-M)\times(N-M)$ principal submatrix of R, and the $(N-M)\times(N-M)$ matrix $\overline{C}_m(\Lambda)$ is the $(m+1)^{st}$ principal submatrix of $$C(l) = \sum_{n=-N-1}^{N-1} \rho(l+n) s_n s_n^H \text{ for } m = 0, 1, \ldots, M.$$

and the Doppler phase shift $\theta_\Lambda$ is then estimated as $$\hat{\theta}_l = \frac{1}{M}\sum_{m=1}^{M} \angle\left[\frac{g_m(l)}{g_{m-1}(l)}\right],$$

where $g_m(\Lambda)$ is the $m^{th}$ element of $g(\Lambda)$ and $\angle[\cdot]$ is the angle of the complex value of the argument.

12. A radar system, comprising:
a receiver;
a processor including a Doppler Compensated Adaptive Pulse Compressor (DCAPC) algorithm; and
a target detector.

13. A radar system as in claim 12, further comprising a transmitter for transmitting an initial radar signal toward a target.

14. A radar system as in claim 12, wherein the DCAPC algorithm comprises:
  a) obtaining $L+(2M-1)(N-1)$ samples y of a radar return signal, where $y(\Lambda)=\tilde{x}^T(\Lambda)s+v(\Lambda)$;
  b) applying Minimum Mean Square Error (MMSE) pulse compression to the radar return signal y to obtain initial radar impulse response estimates $[\hat{x}_1\{-(M-1)(N-1)\}, \ldots, \hat{x}_1\{-1\}, \hat{x}_1\{0\}, \ldots, \hat{x}_1\{L-1\}, \hat{x}_1\{L\}, \ldots, \hat{x}_1\{L-1+(M-1)(N-1)\}]$;
  c) computing power estimates $\hat{\rho}_1(\Lambda)=|\hat{x}_1(\Lambda)|^2$ for $\Lambda=-(M-1)(N-1), \ldots, L-1+(M-1)(N-1)$;
  d) estimating a range cell Doppler shift for each range cell;
  e) computing range-dependent filters according to $w(\Lambda)=\rho(\Lambda)(\mathcal{C}(\Lambda)+R)^{-1}[s\circ e(\Lambda)]$, where $\rho(\Lambda)=|x(\Lambda)|^2$ is the power of $x(\Lambda)$, and $R=E[v(\Lambda) v^H(\Lambda)]$ is the noise covariance matrix, and the range cell Doppler shifts are inserted;
  f) applying the MMSE filters to y to obtain $[\hat{x}_2\{-(M-2)(N-1)\}, \ldots, \hat{x}_2\{-1\}, \hat{x}_2\{0\}, \ldots \hat{x}_2(L-1), \hat{x}_2\{L\}, \ldots, \hat{x}_2\{L-1+(M-2)(N-1)\}]$; and
  g) repeating (c)-(f) for subsequent reiterative stages until a desired length-L range window is reached, thereby resolving the scatterer from noise and other scatterers.

15. A radar system as in claim 14, further comprising a plurality of parallel processors for performing the MMSE pulse compression.

16. A radar system as in claim 14, wherein a nominal level is set for which the power estimates are not allowed to fall below.

17. A radar system as in claim 12, further comprising an analog-to-digital (A/D) converter.

18. A radar system as in claim 12, wherein the DCAPC algorithm comprises:
  a) obtaining $L+(2M-1)(N-1)$ samples y of a radar return signal, where $y(\Lambda)=\tilde{x}^T(\Lambda)s+v(\Lambda)$;
  b) applying matched filtering to the radar return signal y to obtain initial radar impulse response estimates $[\hat{x}_1\{-(M-1)(N-1)\}, \ldots, \hat{x}_1\{-1\}, \hat{x}_1\{0\}, \ldots \hat{x}_1\{L-1\}, \hat{x}_1\{L\}, \ldots, \hat{x}_1\{L-1+(M-1)(N-1)\}]$;
  c) computing power estimates $\hat{\rho}_1(\Lambda)=|\hat{x}_1(\Lambda)|^2$ for $\Lambda=-(M-1)(N-1), \ldots, L-1+(M-1(N-1)$;
  d) estimating a range cell Doppler shift for each range cell;
  e) computing range-dependent filters according to $w(\Lambda)=\rho(\Lambda)(\mathcal{C}(\Lambda)+R)^{-1}[s\circ e(\Lambda)]$, where $\rho(\Lambda)=|x(\Lambda)|^2$ is the power of $x(\Lambda)$, and $R=E[v(\Lambda) v^H(\Lambda)]$ is the noise covariance matrix, and the range cell Doppler shifts are inserted;
  f) applying the MMSE filters to y to obtain $[\hat{x}_2\{-(M-2)(N-1)\}, \ldots, \hat{x}_2-1\}, \hat{x}_2\{0\}, \ldots, \hat{x}_2(L-1), \hat{x}_2\{L\}, \ldots, \hat{x}_2\{L-1+(M-2)(N-1)\}]$; and
  g) repeating (c)-(f) for subsequent reiterative stages until a desired length-L range window is reached, thereby resolving the scatterer from noise and other scatterers.

19. A radar system as in claim 18, further comprising a plurality of parallel processors for performing the MMSE pulse compression.

20. A radar system as in claim 18, wherein a nominal level is set for which the power estimates are not allowed to fall below.

21. A method for processing a received radar pulse from a moving target, comprising:
  a) obtaining $L+(2M-1)(N-1)$ samples y of a radar return signal, where $y(\Lambda)=\tilde{x}^T(\Lambda)s+v(\Lambda)$;
  b) applying matched filtering to the radar return signal y to obtain initial radar impulse response estimates $[\hat{x}_1\{-(M-1)(N-1)\}, \ldots, \hat{x}_1\{-1\} \ldots \hat{x}_1\{0\}, \ldots, \hat{x}_1\{L-1\}, \hat{x}_1\{L\}, \ldots \hat{x}_1\{L-1+(M-1)(N-1)\}]$;
  c) computing power estimates $\hat{\rho}_1(\Lambda)=|\hat{x}_1(\Lambda)|^2$ for $\Lambda=-(M-1)(N-1), \ldots, L-1+(M-1)(N-1)$;
  d) estimating a range cell Doppler shift for each range cell;
  e) computing range-dependent filters according to $w(\Lambda)=\rho(\Lambda)(\mathcal{C}(\Lambda)+R)^{-1}[s\circ e(\Lambda)]$, where $\rho(\Lambda)=|x(\Lambda)|^2$ is the power of $x(\Lambda)$, and $R=E[v(\Lambda) v^H(\Lambda)]$ is the noise covariance matrix, and the range cell Doppler shifts are inserted;
  f) applying the MMSE filters to y to obtain $[\hat{x}_2\{-(M-2)(N-1)\}, \ldots, \hat{x}_2\{-1\}, \hat{x}_2\{0\}, \ldots, \hat{x}_2\{L-1\}, \hat{x}_2\{L\}, \ldots, \hat{x}_2\{L-1+(M-2)(N-1)\}]$; and
  g) repeating (c)-(f) for subsequent reiterative stages until a desired length-L range window is reached, thereby resolving the scatterer from noise and other scatterers.

* * * * *